Feb. 23, 1937.  K. VON LÜDE  2,071,868
RECOVERY OF MOISTURE FOR USE ON LIGHTER-THAN-AIR AIRCRAFT
Original Filed April 21, 1934
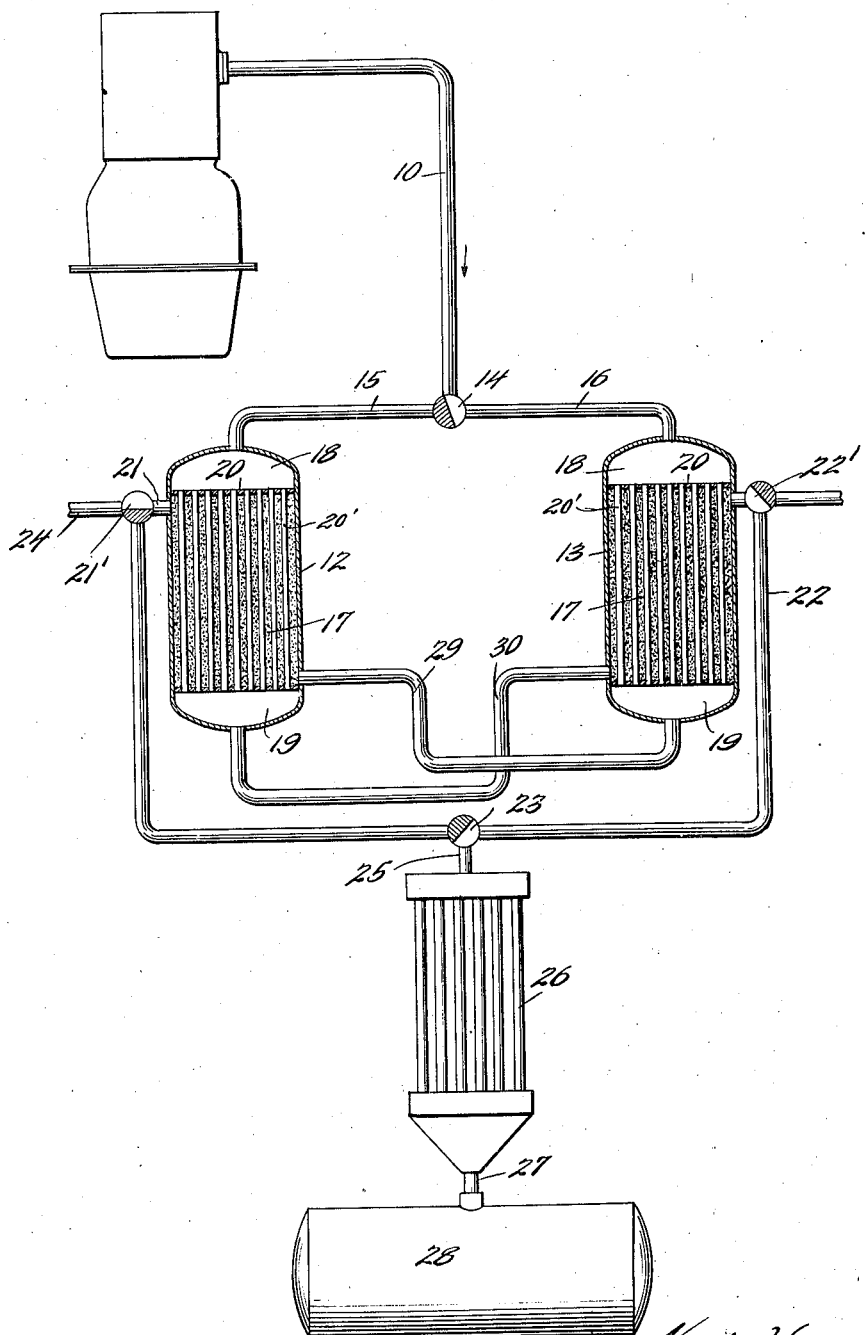

Patented Feb. 23, 1937

2,071,868

UNITED STATES PATENT OFFICE 2,071,868

RECOVERY OF MOISTURE FOR USE ON LIGHTER-THAN-AIR AIRCRAFT

Kurt von Lüde, Berlin, Germany

Application April 21, 1934, Serial No. 721,830
Renewed June 18, 1935. In Germany June 7, 1932

3 Claims. (Cl. 183—4)

This invention has for its object the recovery, as useful water for aircraft, of the moisture of atmospheric air or other moist gases, e. g. the combustion gases of the aircraft, by means of a sorption and regeneration process, with subsequent condensation. In this process, the gases, charged with moisture, are brought into contact with a sorption medium capable of regeneration, e. g. silica gel, and the moisture thereby adsorbed is driven off again from the sorption material by a regeneration process, e. g. by heating, and is thus obtained either as pure water-vapour or in such high concentration in other gases, e. g. air, that it can be readily condensed with the assistance of atmospheric air or any other cooling agent available.

The invention may be best understood by reference to the following specification and accompanying drawing in which the single figure is a schematic showing of the invention.

The invention is primarily of importance for gas-supported engine-driven aircraft with which it was hitherto necessary, as the flight progressed, to compensate for the reduction of weight due to fuel-consumption by letting off supporting gas, so that, upon commencing a new flight, the charge of supporting gas must be replenished. The necessity for letting off gas also restricts the flight of the craft to a relatively small range of altitudes and thereby reduces its manoeuvreability.

Owing to the regeneration, it is possible to operate with a relatively small weight of the adsorption material and thus to meet a principal condition of aircraft-construction, viz.—lightness. The production of pure water-vapour or of a high vapour-concentration permits of the cooling surfaces for condensation being made small and light and, moreover, of the performance of the cooling with a relatively small quantity of extraneous air. For aircraft, the latter factor is likewise extremely important, as large cooling surfaces, apart from their great weight, also offer an extremely high resistance to the wind of flight available for the cooling.

The regeneration of the sorption medium may be effected by heating with the assistance of the hot exhaust gases which otherwise escape unused into the open. Instead of or in addition to moist atmospheric air, use may also be made of the very moist combustion gases from the engines. In this case, the exhaust gases will first give up their heat, for regeneration purposes, to sorption medium previously saturated with moisture and will then be brought into conjunction with fresh sorption medium for the purpose of giving up their own moisture.

Also a combination of the above effects can be obtained by bringing the exhaust gases, after they have given up heat for the purpose of regeneration and after atmospheric air has been admixed, into contact with the sorption medium, so that the moisture both of the engine-exhaust gases and of the atmospheric air is recovered as useful water.

An attempt has been made to secure the water contained in vapour- or cloud-form in the atmospheric air by hygroscopic means in order to be able to obtain the necessary increase of weight during flight. Since, on the one hand, however, the necessary quantity of ballast is very large and on the other hand the correspondingly large quantity of the hygroscopic medium required for the purpose must be carried on the aircraft, the method has not found use in practice. For ballast purposes an attempt has also been made to utilize by condensation the water vapour contained in the combustion gases of the engines, but on account of the low concentration of the water vapour in these gases, the condensers are very large and heavy for a relatively small result and produce a large increase of the resistance to flight.

Having reference now to the drawing, there is shown at 10 the exhaust pipe from an internal combustion engine, the gas from which is selectively delivered to either adsorber 12 or 13 by means of two-way valve 14 and pipes 15 and 16. Each adsorber comprises a chamber separated into a central compartment 17 containing the adsorbent material and the end compartments 18 and 19 by tube sheets 20 connected by tubes 20' embedded in the adsorbent. Outlet pipes 21 and 22 from the adsorbent chambers lead to the two-way valve 23 having a pipe 25 leading to the condenser 26, air cooled and discharging through pipe 27 into the water storage tank 28. Pipe 29 leads from the adsorbent chamber of 12 to the compartment 19 or 13 and pipe 30 leads from the adsorbent chamber of 13 to the compartment 19 of 12.

In operation the water-vapor-laden exhaust gas passes to the right as the valve 14 is shown to be set, through the pipe 16 and previously saturated adsorber 13 to indirectly heat the adsorbent therein and drive off the moisture through pipe 22 by the heat of the gas. The vapor passes through pipe 22, valve 23, and pipe 25 to the condenser where it is cooled atmospherically and the water condensed and drained into the storage tank for use. The gas passing through the tubes 20' of adsorber 13 is still saturated with moisture and is conducted through pipe 29 to the adsorbent chamber of adsorber 12, previously activated, where the moisture in the gas is adsorbed. The stripped gas passes out through the pipe 21, valve 21' and exhaust pipe 24 to the atmosphere.

When the adsorber 13 has been suitably dried or activated and the adsorber 12 saturated with water, the valves 14, 23, 21' and 22' are reversed and the same process takes place as previously described.

The practical efficiency of the process can be recognized from the following example which is designed for the conditions obtaining with an airship but is naturally generally applicable.

Assuming an average moisture content of the air of 11 grms. of water per cubic metre, 10 grms. of water per cubic metre can be adsorbed without trouble with about 50 grms. of gel. In order therefore, to adsorb 1 kg. of water per minute, an air-volume of, on an average, 100 cubic metres per minute must be treated, 5 kgs. of gel per minute being in all required for the purpose. If a suitable heat-exchange apparatus is chosen, the re-generation of these 5 kgs. of gel by means of the warm exhaust gases, at about 380° C., from the airship's engines can be achieved by utilizing the temperature drop down to about 180° C. The weight of exhaust gases which is required for evaporating 1 kg. of water from the adsorbent amounts to about 25 kgs. On the other hand, for a consumption of about 1 kg. of fuel, about 35 kgs. of exhaust gases are available, so that, with a fuel consumption of 1 kg., 35/25=1.4 kgs. of water can be recovered by the regeneration process. The quantity of exhaust heat available is thus so large that a 40% greater weight of water can be evaporated from the adsorbent than fuel is consumed. As the periods of adsorption and regeneration are short, the quantity of adsorbent, e. g. gel required per kg. of water-adsorption per minute is relatively small and thus an undesirably large increase of weight due to the apparatus for obtaining the ballast water is not to be feared.

I claim:

1. The process of recovering water to act as ballast from the exhaust gases of an internal combustion motor on aircraft, the steps of passing the hot exhaust gases in heat interchange relation with a mass of porous solid adsorbent material that has become charged with water from only the exhaust gases, condensing water from the highly concentrated water vapor gas mixture driven off from said mass; passing the cooled exhaust gases through another mass of porous solid adsorbent material to adsorb water vapor therefrom, and after the water has been driven off from the first mass, reversing the masses in the cycle so that the second is regenerated by the hot gases and the first used to adsorb water vapor.

2. The process of recovering useful water on aircraft operated by an internal combustion motor, the steps of passing hot exhaust gases from the motor in heat interchange relation with a mass of porous solid adsorbent material that has previously become charged with water adsorbed from exhaust gases from the motor, condensing water from the highly concentrated water vapor gas mixture driven off from said mass solely by heat taken from said exhaust gases, passing exhaust gases from the motor through another mass of porous solid adsorbent material to adsorb water vapor therefrom, and after the water has been driven off from the first mass, reversing the masses in the cycle so that the second is regenerated by the hot gases and the first used to adsorb water vapor.

3. The process according to claim 2 wherein the exhaust gases first give up their heat to drive off water vapor from charged adsorbent material and then in a cooled state are passed into other adsorbent material to have their water vapor recovered.

KURT von LÜDE.